(12) United States Patent
Cavin et al.

(10) Patent No.: US 10,295,692 B2
(45) Date of Patent: May 21, 2019

(54) FRACTURE DETECTION AND LOCALIZATION USING ACOUSTIC REFLECTIONS

(71) Applicant: SCHLUMBERGER TECHNOLOGY CORPORATION, Sugar Land, TX (US)

(72) Inventors: Dustin Cavin, Katy, TX (US); Carl Robbins, Rosharon, TX (US); Ralph M. D'Angelo, North Weymouth, MA (US); Kenneth W. Winkler, Ridgefield, CT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/364,378

(22) Filed: Nov. 30, 2016

(65) Prior Publication Data

US 2017/0192119 A1 Jul. 6, 2017

Related U.S. Application Data

(60) Provisional application No. 62/261,087, filed on Nov. 30, 2015, provisional application No. 62/261,125, filed on Nov. 30, 2015.

(51) Int. Cl.
*G01V 1/40* (2006.01)
*G01V 1/50* (2006.01)
*G01V 1/44* (2006.01)
*G01V 1/30* (2006.01)
*G01V 1/42* (2006.01)

(52) U.S. Cl.
CPC ............... *G01V 1/50* (2013.01); *G01V 1/301* (2013.01); *G01V 1/44* (2013.01); *G01V 1/42* (2013.01); *G01V 2210/646* (2013.01)

(58) Field of Classification Search
CPC ... G01V 1/44; G01V 1/46; G01V 1/48; G01V 1/50; G01V 1/301; G01V 2210/646
See application file for complete search history.

(56) References Cited

U.S. PATENT DOCUMENTS 4,881,208 A * 11/1989 Liu .................... G01V 1/46
181/105
4,888,740 A * 12/1989 Brie ..................... G01V 1/50
181/102

(Continued)

*Primary Examiner* — Ian J Lobo

(57) ABSTRACT

An acoustic array includes an acoustic transmitter and acoustic receivers radially or longitudinally offset from the acoustic transmitter. The acoustic array is disposed in a wellbore penetrating a subsurface formation. An acoustic signal is broadcast using the transmitter and a portion of the emitted signal is reflected by a reflector and received by the receivers. The presence or absence of fractures in the subsurface formation is inferred based on the received acoustic signal. Inferences are based on travel times and/or coherency of the received signals. Images can be made and fracture orientations determined. Frequencies in the sonic or ultrasonic range may be used. Measurements may be made while-drilling or while performing post-drilling operations. Processing may be done in real-time or post-processing may be performed on recorded data.

14 Claims, 10 Drawing Sheets

(56) References Cited

U.S. PATENT DOCUMENTS

| | | | | |
|---|---|---|---|---|
| 6,192,316 B1* | 2/2001 | Hornby | ............... | G01V 1/50 367/38 |
| 2014/0290936 A1* | 10/2014 | Wills | ............... | E21B 43/26 166/250.1 |
| 2015/0293251 A1* | 10/2015 | Kinoshita | ............ | G01V 1/44 367/25 |

* cited by examiner

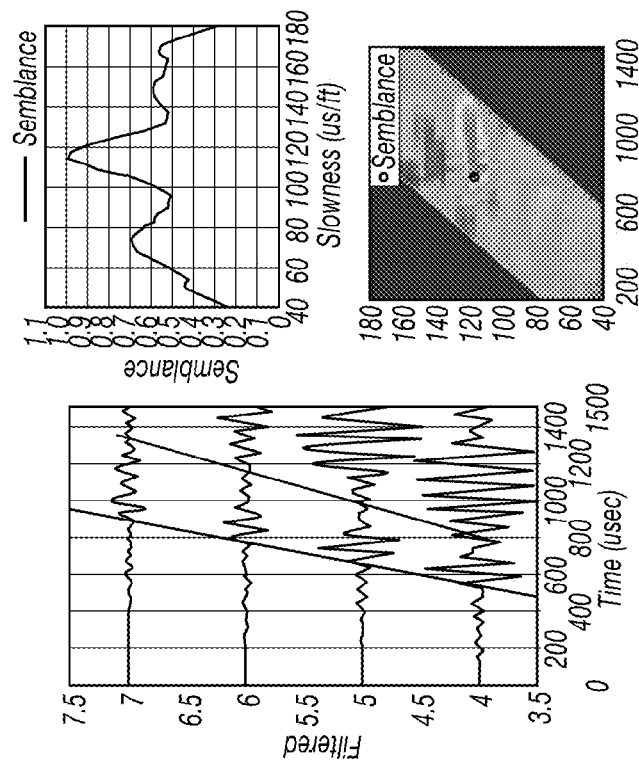
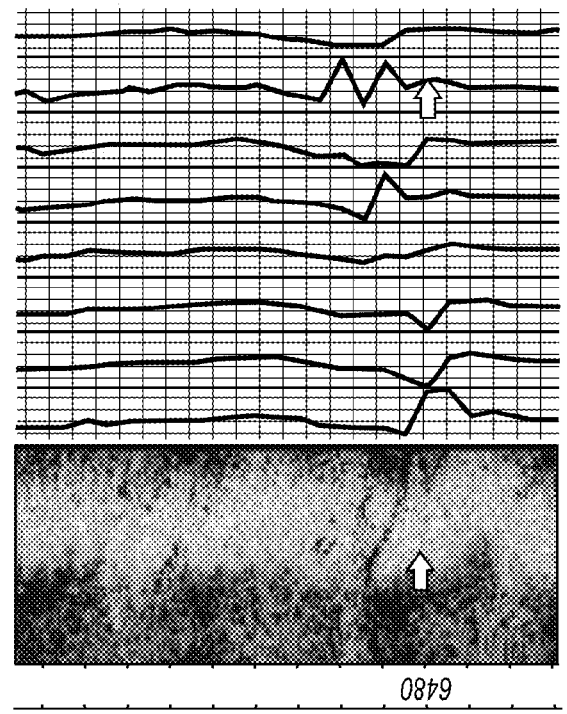
FIG. 5F
FIG. 5E
FIG. 5D
FIG. 5C
FIG. 5B
FIG. 5A

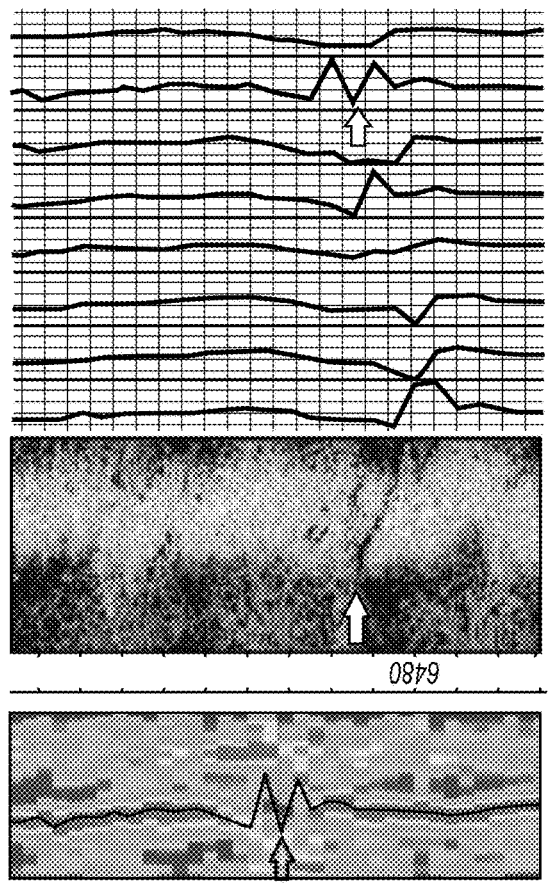
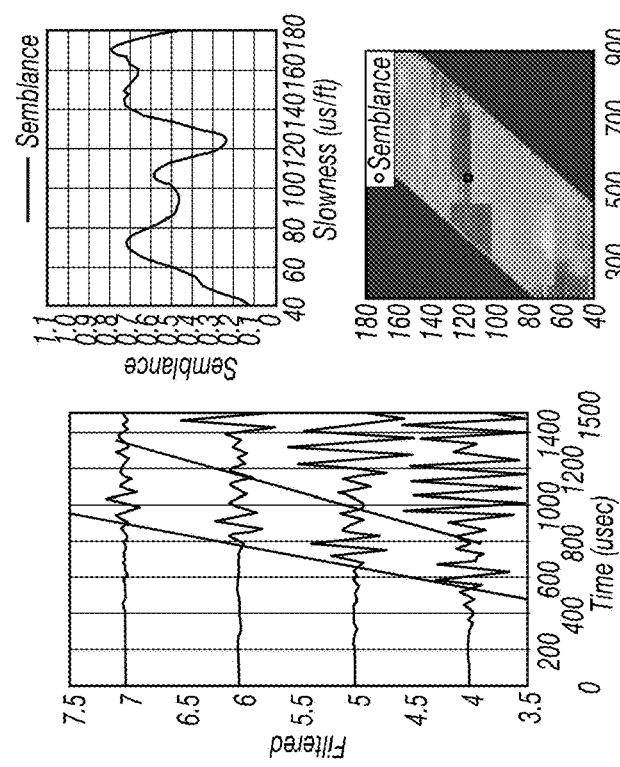
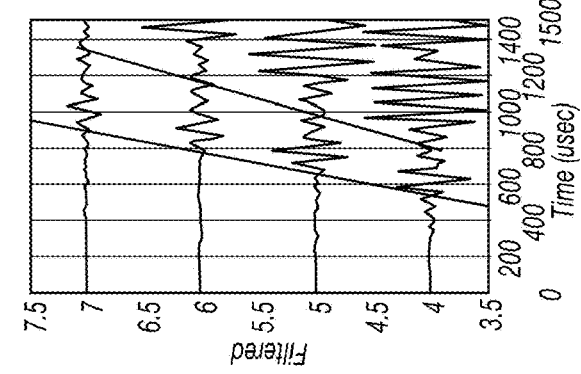
FIG. 6A  FIG. 6B  FIG. 6C  FIG. 6D  FIG. 6E  FIG. 6F ly in the fracture imaging and fracture counting methods, largely
FRACTURE DETECTION AND LOCALIZATION USING ACOUSTIC REFLECTIONS

CROSS-REFERENCE TO RELATED APPLICATIONS

This application claims the benefit of U.S. Provisional Application No. 62/261,125 and U.S. Provisional Application No. 62/261,087, both filed Nov. 30, 2016.

BACKGROUND OF THE DISCLOSURE

In recent years there has been very strong demand for fracture imaging and fracture counting methods, largely driven by shale fracturing drilling ("fracking") and completions design for lateral shale wells. Because of this demand, attention has turned to acoustic measurements, and especially microsonic techniques. Locating and imaging fractures is used in the process of locating hydrocarbons and, if found, optimizing the completions processes. Those fractures can be difficult to detect for a variety of reasons, including mud type and the condition of the fracture. For instance, a fracture may be an open fracture or it may be one that has healed and therefore has relatively low acoustic contrast relative to adjacent formations. Electrical resistivity tools have been used to locate fractures, but they are useful only in certain wellbore environments and therefore have limited applicability.

SUMMARY

An acoustic array includes an acoustic transmitter and acoustic receivers radially or longitudinally offset from the acoustic transmitter. The acoustic array is disposed in a wellbore penetrating a subsurface formation. An acoustic signal is broadcast using the transmitter and a portion of the emitted signal is reflected by a reflector and received by the receivers. At least one of the receivers that receives the reflection is located on the same side of the reflector as the transmitter. The presence or absence of fractures in the subsurface formation is inferred based on the received acoustic signal. Inferences are based on travel times and/or coherency of the received signals. Images can be made and fracture orientations determined. Frequencies in the sonic or ultrasonic range may be used. Measurements may be made while-drilling or while performing post-drilling operations. Processing may be done in real-time or post-processing may be performed on recorded data.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Embodiments are described with reference to the following figures. The same numbers are generally used throughout the figures to reference like features and components.

FIG. 5A is a plot of waveforms in a minimally fractured area, in accordance with the present disclosure.

FIG. 5B is a plot of slowness versus time for the waveforms of FIG. 2A, in accordance with the present disclosure.

FIG. 5C is a plot of semblance versus slowness for the waveforms of FIG. 2A, in accordance with the present disclosure.

FIG. 5D is a plot of the slowness time coherence computed from an axial array disposed in the minimally fractured area of FIG. 2A, in accordance with the present disclosure.

FIG. 5E is an ultrasonic pulse echo borehole image of the minimally fractured area of FIG. 2A showing no considerable fractures, in accordance with the present disclosure.

FIG. 5F is a plot of 8 shear slowness curves corresponding to 8 sectors of the borehole of FIG. 2E, in accordance with the present disclosure.

FIG. 6A is a plot of waveforms in a fractured area, in accordance with the present disclosure.

FIG. 6B is a plot of slowness versus time for the waveforms of FIG. 3A, in accordance with the present disclosure.

FIG. 6C is a plot of semblance versus slowness for the waveforms of FIG. 3A, in accordance with the present disclosure.

FIG. 6D is a plot of the slowness time coherence computed from an axial array disposed in the fractured area of FIG. 3A, in accordance with the present disclosure.

FIG. 6E is an ultrasonic pulse echo borehole image of the fractured area of FIG. 3A showing fractures, in accordance with the present disclosure.

FIG. 6F is a plot of 8 shear slowness curves corresponding to 8 sectors of the borehole of FIG. 3E, in accordance with the present disclosure.

DETAILED DESCRIPTION

Figure 1A:
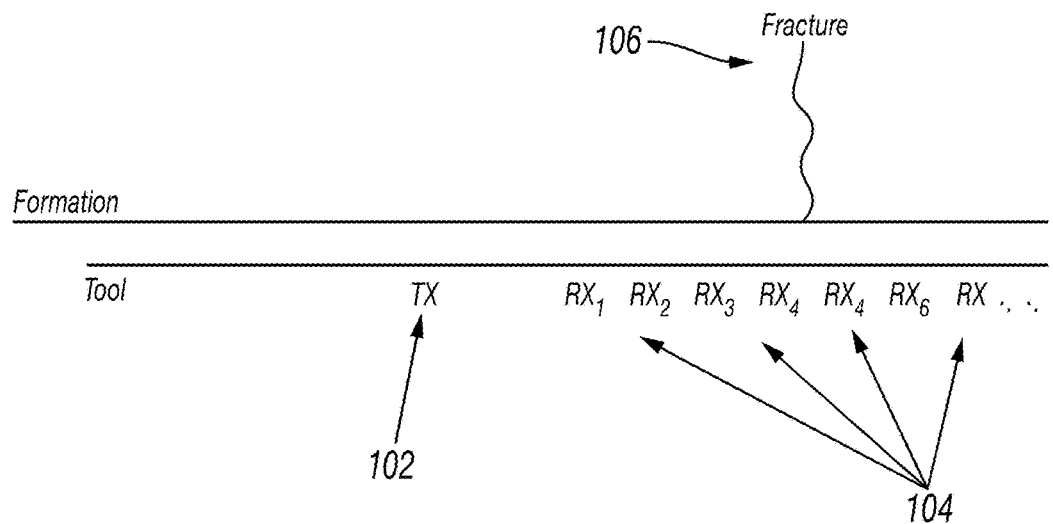
FIG. 1A is schematic drawing of a sonic or acoustic tool disposed in a wellbore penetrating or traversing a subsurface formation, in accordance with the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship, as appropriate. It will also be understood that, although the terms first, second, etc. may be used herein to describe various elements, these elements should not be limited by these terms. These terms are only used to distinguish one element from another.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Any wave propagation will result in a reflection when it encounters an impedance contrast. Wellbore fractures represent an impedance contrast to propagating pressure waves created by acoustic tools. The detection of waves propagating towards a transmitter can be used to detect fractures and determine their locations relative to the measurement point using the arrival time and velocity of the reflected waves.

A system and method to detect various fracture types, in many operating conditions, is disclosed. The effects of a fracture can be detected by an acoustic array as it moves near the fracture. The acoustic array comprises a transmitter and one or more receivers distributed either radially or axially along a tool body and displaced from the transmitter by a fixed distance. The transmitter is configured to transmit at a fixed or variable rate, while the receivers are monitored (i.e., sampled in synchronization with the transmission). The one or more acoustic receivers can be optimally arranged to detect a reflected portion of the transmitted acoustic signal while discriminating against the acoustic signal from the transmitter itself. In the embodiments described herein, fractures may be detected using reflections from the fracture.

In one embodiment, an acoustic array detection system comprises a transmitter and two or more receivers mounted on a tool collar. The detection system is run downhole such as during drilling operations or during a post-drilling measurement operation. The transmitter will "fire", creating a refracted signal in the formation that is detected by the receivers. Multiple receivers can be used—one embodiment comprises four receivers.

In one embodiment a downhole tool disposed in a wellbore comprises a pressure transmitter and a multitude of pressure receivers (for example, piezoceramic components) arranged such that energy in the form of pressure waves will propagate from the transmitter, through the formation, and past the receivers. This tool may be used to determine the velocity of the waves that travel through the formation using a variety of methods such as cross-correlation, slowness time coherence (STC), $N^{th}$ root stack (e.g., used in the resolution of STC), Hilbert semblance (i.e., where correlation is computed from the envelope of the waveforms), or first motion. Coherency processing, such as STC, is generally used as it may provide a superior measurement. Semblance may be based on STC or correlation and may be computed using known techniques. Semblance and coherency may be used interchangeably and may both refer to the degree of correlatedness between a series of waveforms.

STC is known in the art. Stated very simply, it produces a 2-dimensional array of coherency (velocity or its reciprocal, slowness, vs. arrival time) by comparing waveforms from an array of receivers. This is traditionally produced for positive velocities, i.e., waves traveling away from the transmitter. The other processing techniques mentioned above are also generally known and meant as examples of possible processing techniques, not as an exhaustive list. While STC is used in the descriptions below, it is meant to be an example and not limiting.

However, STC processing may also be used to aid in detecting fractures. Using STC results calculated for negative velocities, we can identify waves traveling toward the transmitter. These waves show up as peaks in the STC plane. These coherency peaks mirror the corresponding peaks in the positive STC results, as the waves travel in the same medium and therefore at the same speed. Those positive velocity STC results can be used to guide the search for negative velocity peaks since the negative velocity peaks may be lower in both energy and coherence. Once a reflection is identified in the STC results, the location of the reflector (fracture) can be determined by the product of the wave velocity and its arrival time at the respective receiver.

As stated above, fractures represent an impedance contrast to a propagating wave. Some portion of the energy in a pressure wave will be reflected as it encounters this impedance contrast and some portion will propagate across. These proportions are a function of the contrast ratio. The embodiments described herein rely upon the fact that these reflections will propagate back toward the source. Thus, in all embodiments at least one receiver will be on the same side of the acoustic impedance contrast giving rise to the reflection as the transmitter.

As a portion of the refracted signal, which is often referred to as a formation headwave, propagates away from the transmitter along the formation/fluid interface of a wellbore, some energy effectively refracts back into the borehole where it is detected by the receivers. The time delay between the received signals at different receivers and the amplitudes of those signals can be very useful in determining certain formation properties. For example, formation headwave compressional and shear wave component travel times can be used to infer formation characteristics or properties that can be very useful for developing efficient well completion strategies. Such rock properties may include, but are not limited to, Young's modulus, Poisson's ratio, and bulk modulus.

Fractures often exist in reservoir formations. It is of interest to know where they intersect the borehole, and, if possible, to determine characteristics of the fractures, including aperture (width) and strike (orientation). Using acoustic techniques, fractures can be detected because they perturb or affect a headwave that encounters them. For example, a fracture may cause an incoming signal to reflect. That is, at least some of the energy is re-directed in different directions. However, not all the energy is reflected. Some may continue to propagate as a formation headwave along the borehole wall. The energy propagating along the interface as a headwave is constantly refracting back (i.e., "leaking") into the borehole at some critical angle that depends on the acoustic velocity of the fluid and the acoustic velocity of the formation (at the particular point where the energy leaves the formation and enters the fluid), in accordance with Snell's Law. The leaked energy may be detected by the receivers. Stated in a slightly different way, at each fracture, a portion of the energy may be reflected (for example, as a compressional headwave, a shear headwave, or some other interface wave), and a portion may be transmitted or passed through the fracture (again, as a compressional headwave, a shear headwave, or some other type of interface wave). At least some of that energy refracted into the borehole travels to and is detected by the receivers. Thus, at least some of both portions (reflected and transmitted) of the incident energy ultimately returns to the wellbore where it is detected by the receivers. The detected signal can be either attenuated (i.e., signal amplitude at one receiver is less than amplitude of same signal at another receiver) or poorly correlated.

This can be extended to localization within the array through the processing of receiver subarray information. A "receiver subarray" is one or more contiguous receivers representing a subset of the full array. If a fracture lies between Receiver $RX_n$ and Receiver $RX_{n+1}$, then the reflection will be present in the STC analysis that includes $RX_1$ through $RX_n$ but not in $RX_{n+1}$ and beyond.

FIGS. 1A-1E are schematic drawings of a sonic or acoustic tool disposed in a wellbore penetrating or traversing a subsurface formation. As shown in FIG. 1A, the tool has a transmitter 102 and a plurality of receivers 104. An example fracture 106 in the formation is shown. While only one fracture is shown for illustration and discussion, there may be many fractures present.

Figure 1B:
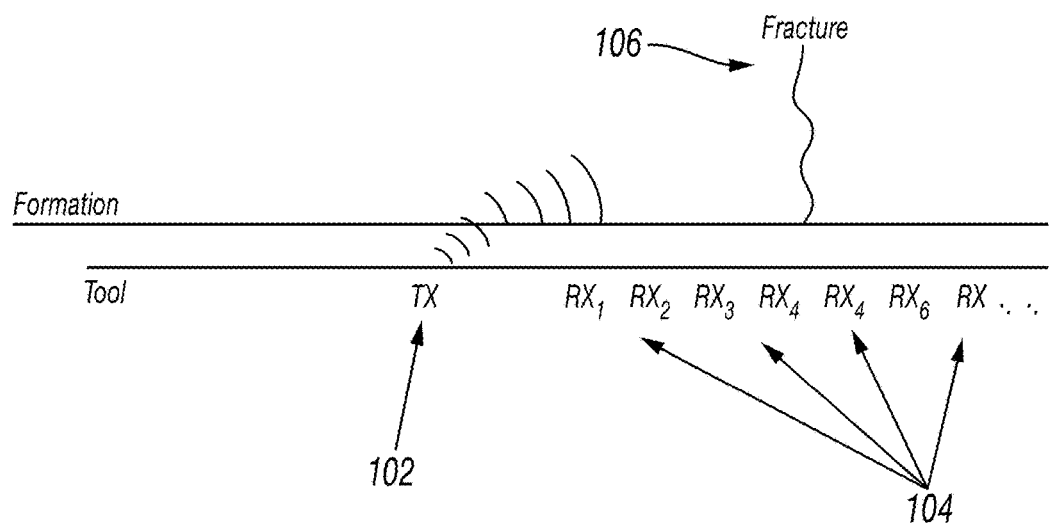
FIG. 1B shows a pressure wave from the transmitter propagating towards the receiver array, in accordance with the present disclosure.
Figure 1C:
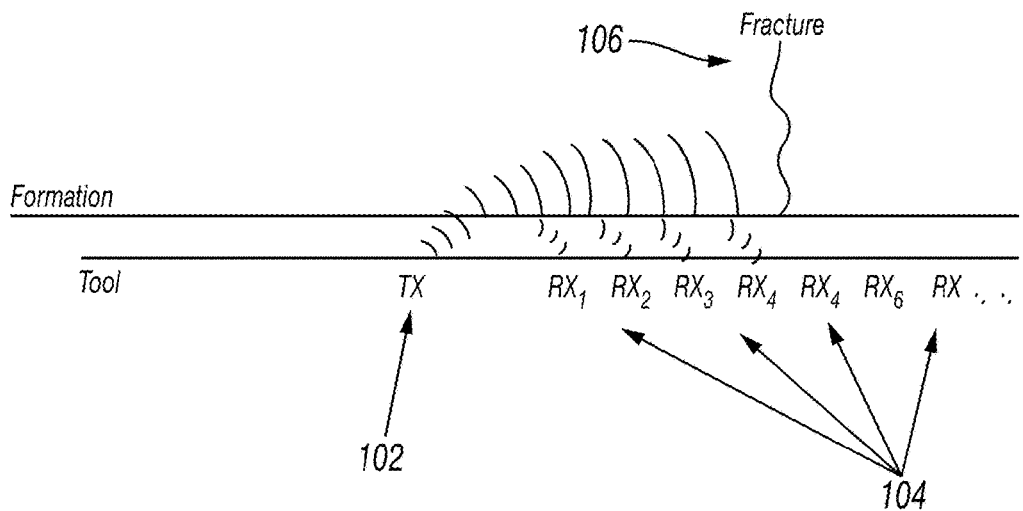
FIG. 1C shows that the pressure wave propagating through the formation creates pressure waves in the wellbore fluid measured by the receivers in the receiver array, in accordance with the present disclosure.
Figure 1D:
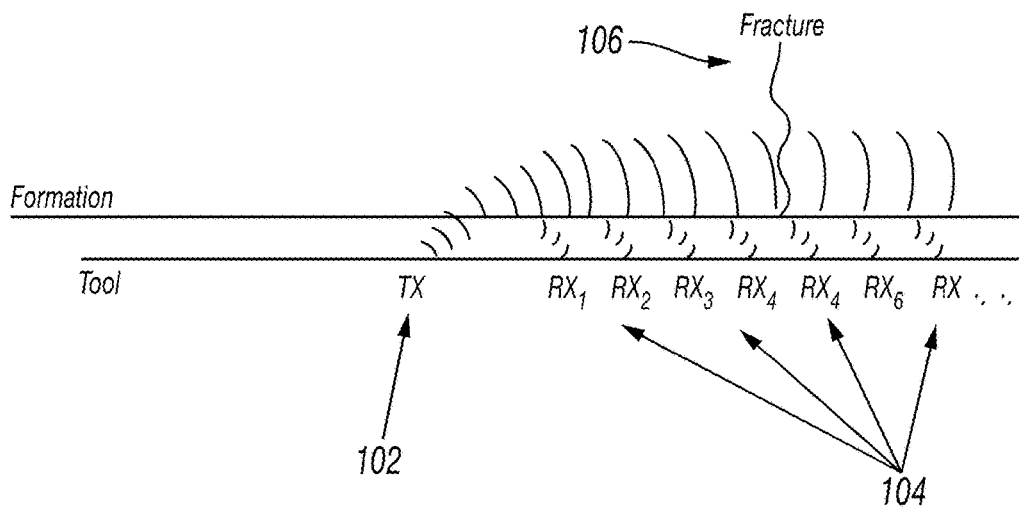
FIG. 1D shows that these formation waves will continue beyond the fracture, in accordance with the present disclosure.
Figure 1E:
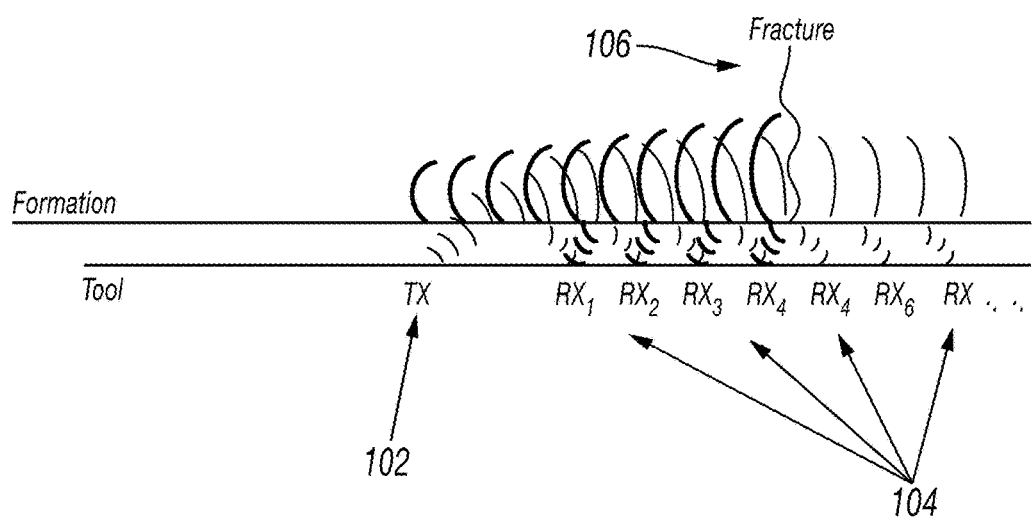
FIG. 1E shows that the reflection from the fracture will propagate towards the transmitter and also create pressure waves in the wellbore fluid measured by the receivers in the receiver array, in accordance with the present disclosure.

FIGS. 1A-1E also show the time domain progression of an original wave and its reflection. Specifically, FIG. 1A shows a tool in proximity to a formation containing a fracture. FIG. 1B shows a pressure wave from the transmitter propagating in the general direction of the receivers. FIG. 1C shows that the pressure wave propagating through the formation creates pressure waves in the wellbore fluid measured by the receivers. FIG. 1D shows that these formation waves will continue beyond the fracture. FIG. 1E shows that the reflections from the fracture will propagate in the formation in the general direction of the transmitter and also create pressure waves in the wellbore fluid measured by the receivers.

Figure 2:
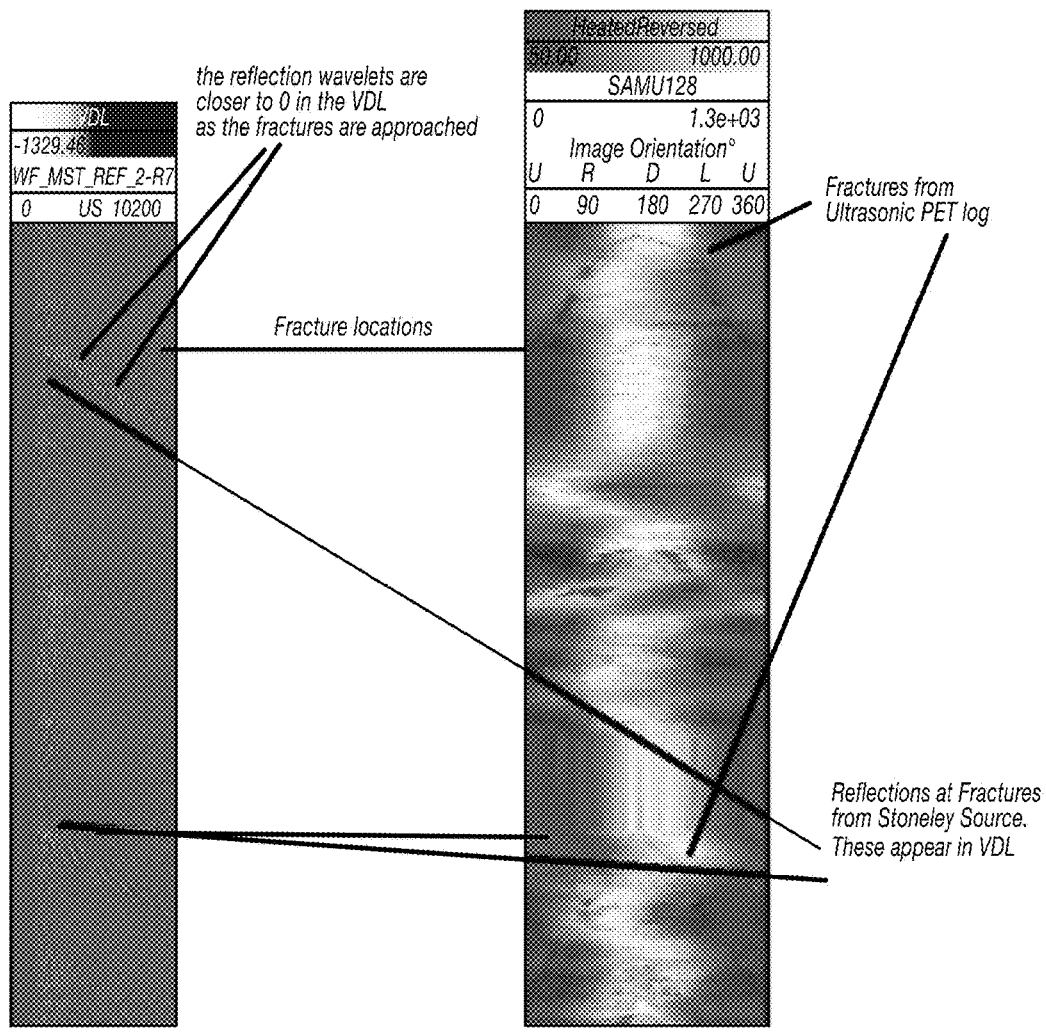
FIG. 2 illustrates the results of Stoneley wave reflection at a fracture compared to a pulse echo ultrasonic image of the borehole wall, in accordance with the present disclosure.

An alternative embodiment to detect fractures is to plot the variable density log (VDL) at individual or multiple receiver locations as the fracture is approached and the reflection traverses the array in the opposite direction of the wavefront travelling from the transmitter. The VDL display format will show the reflection signal moving across the array as depth is increased. A VDL is plotted at successive depths at each receiver. The reflection location patterns may be recognized as the fracture is approached. The wavefront can be separated into downgoing and upgoing wavefronts using suitable processing technique. FIG. 2 illustrates the results of Stoneley wave reflection (a type of interface wave) at a fracture compared to a pulse echo ultrasonic image of the borehole wall.

The left column of FIG. 2 shows a VDL plot of waveforms resulting from the detected Stoneley waves. Note the events that appear as linear patterns—the VDL shows two such events: an upper event and a lower event. In the record shown, each event shows signal (i.e., the reflected waveforms) being detected at various times (horizontal axis, increasing to the right) as the receiver location (vertical axis, increasing downward) changes in the wellbore and relative to the fracture. The signal arrives sooner as the receiver gets closer to the fracture. The reason for this is the reflection does not travel as far as the receiver gets closer to the fracture. The linear appearance of the events or wavelets is the pattern that identifies the reflector, in this case a fracture. Each fracture location corresponds to the station location and the particular azimuth in the wellbore where the linear pattern approaches or intersects the earliest arrival of the reflected wave at the receiver.

The right column of FIG. 2 is a pulse echo log. It shows, in a two-dimensional display, azimuthal scans of a wellbore at various wellbore depths. That is, the vertical axis is wellbore depth (increasing downward) and the horizontal axis is the azimuthal or circumferential span of the wellbore from zero to 360 degrees, where 360 degrees corresponds to zero degrees. The fracture locations shown in the pulse echo log correlate closely with the fracture locations determined from the linear reflection patterns. That is, the pulse echo log shows fractures located at the same two (upper and lower) measurement stations.

An acoustic signal can be broadcast from a plurality of locations that are depth-wise or azimuthally distinct. The acoustic data acquired from those various locations can be used to produce one or more images of the wellbore. The acoustic data may particularly be used to produce one or more images of a reflector proximate the wellbore such as a fracture. The orientation of such a fracture can be determined using the produced images.

Formation bed boundaries can also present an impedance contrast leading to a reflection. These can be differentiated from fractures by noting an associated change in formation bulk properties such as the formation velocity at the same location.

The techniques disclosed herein can be performed downhole (for example, while drilling or reaming) or post-processed with recorded waveform data. Fracture detection is independent of mud type. Healed and conductive fractures and axial fractures can be detected, without regard to the borehole wall rugosity. Also, no nuclear sources are used. Since these embodiments are applicable independent of frequency, various frequencies can be used for the transmitted signal, which may range from the sonic (approx. 20 Hz-20 KHz) to the ultrasonic (>20 KHz) frequencies. As used herein and particularly in the claims, the terms "acoustic" and "sonic" mean relating to or using sound or pressure waves, wherein "sound" or "pressure wave" refers to vibrations that travel through one or more tangible media that support the wave. The embodiments described herein may be used with any form of conveyance (e.g., wireline, drill string, coiled tubing, etc.).

Figure 3:
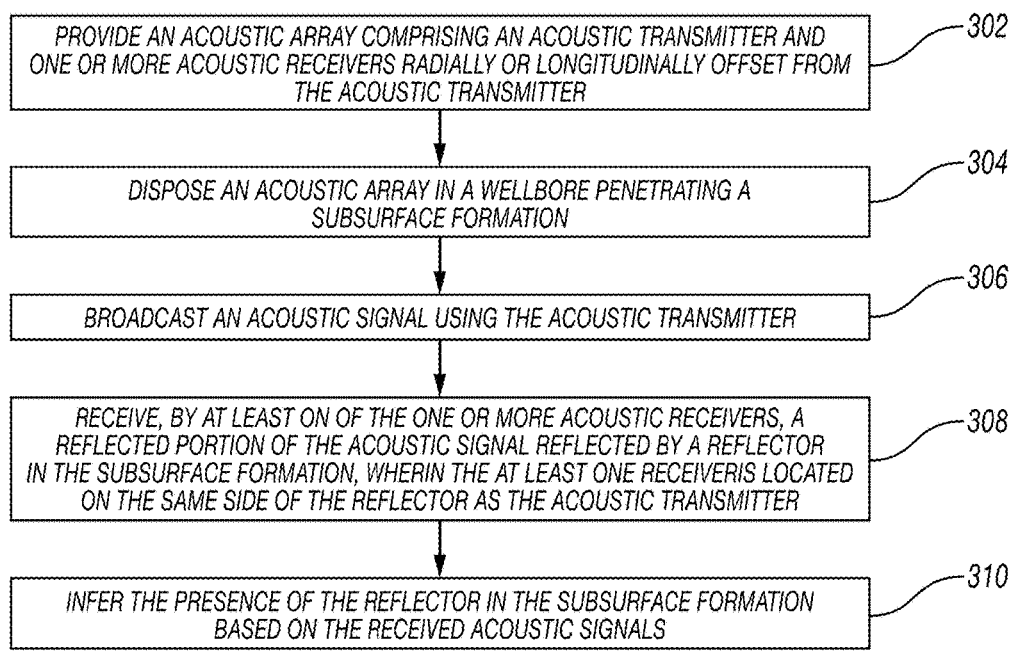
FIG. 3 is a flowchart for using an acoustic array to infer the presence or absence of fractures in a subsurface formation, in accordance with the present disclosure.

FIG. 3 is a flowchart showing one possible embodiment. In this embodiment, an acoustic array comprising an acoustic transmitter and one or more acoustic receivers radially or longitudinally offset from the acoustic transmitter is provided (302). The acoustic array is disposed in a wellbore penetrating a subsurface formation (304). An acoustic signal is broadcast using the acoustic transmitter (306). At least one of the one or more acoustic receivers receives a reflected portion of the acoustic signal reflected by a reflector in the subsurface formation, wherein the at least one receiver is located on the same side of the reflector as the acoustic transmitter (308), and the presence of the reflector in the subsurface formation is inferred based on the received acoustic signal (310).

In some embodiments, when a fracture is encountered between two receivers, the fracture causes a modification in the signal from one receiver to the next. The signal is modified in at least two ways. The first is a simple reduction in magnitude, from one receiver to the next. This can be detected by monitoring magnitudes of the received signals. An anomaly in the magnitudes indicates a fracture between the receivers. The second way is a distortion of the coherency of the waveform. Coherency refers to the phase difference and frequency of two waves. Coherency can be evaluated using, for example, a slowness time coherence (STC) algorithm, which is used to measure the travel time of a formation signal as it travels to the various receivers. If one or more of the receiver signals is distorted by the effects of a fracture, and in particular by the detection of a reflection travelling back from the fracture, the semblance can be distorted.

Figure 4B:
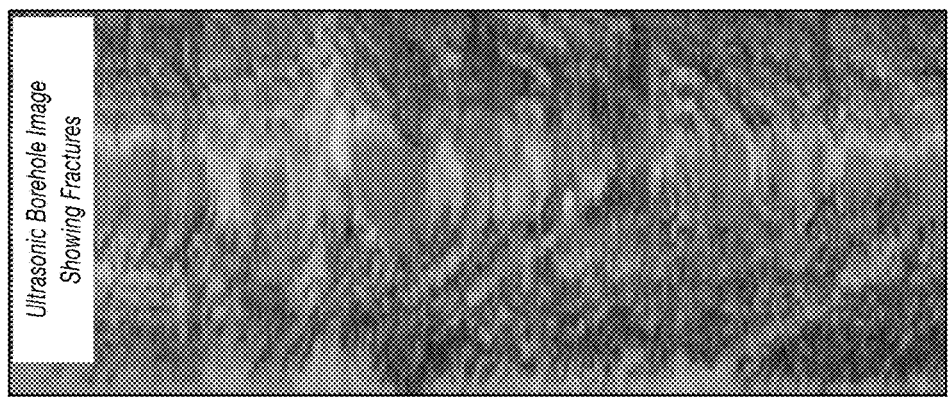
FIG. 4B is an ultrasonic pulse echo borehole image showing fractures, in accordance with the present disclosure.
Figure 4A:
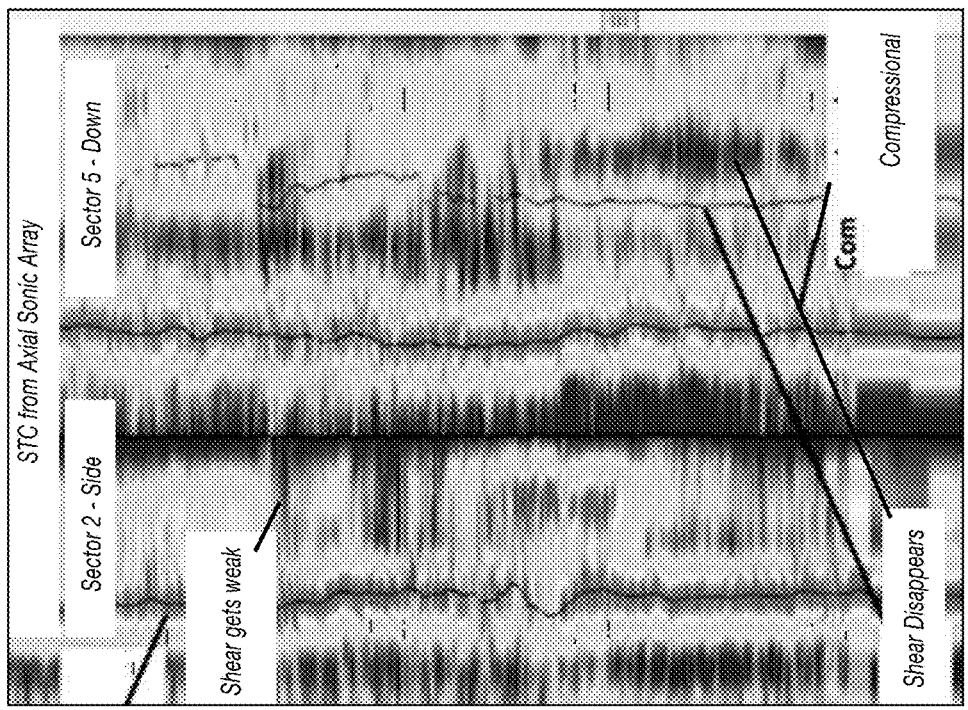
FIG. 4A is a plot of the slowness time coherence computed for two orientations of an axial array disposed in a highly fractured area of a borehole, in accordance with the present disclosure.

FIG. 4A illustrates the effect on STC for the shear component for multiple sectors or orientations of an axial array in a highly fractured area of the borehole. The plots on the left are computed from an axial array oriented in sector 2 (horizontal) and the plots on the right are from sector 5 (vertical). The shear coherency in the horizontal sector is distorted and in the vertical sector it disappears altogether.

FIG. 4B is an ultrasonic pulse echo borehole image showing fractures. The ultrasonic image shows the characteristic fracture pattern in a highly laminar formation. The V-shaped lines are the fractures.

FIGS. 5A-5F were produced using actual waveform data. Those data were taken in an area of a borehole where there is minimal fracturing. The shear component is readily resolved in the waveforms plot (FIG. 5A) and the STC plot (FIG. 5B). FIG. 5A shows four different waveforms for the same signal. Actually, there are two overlaying sets of four different waveforms. One set is raw (unfiltered) data and the other set is filtered. The filtered data were used in the coherency/semblance computations of FIGS. 5B and 5C. The signal moves across the array, uninterrupted by fractures. The waveforms show a high degree of similarity or coherence for the shear component (see FIG. 5C).

FIGS. 6A-6F were also produced using actual waveform data. Those data were taken from the same borehole as above, but in an area where fractures are encountered. The fracture effects are readily apparent in the waveforms plot (FIG. 6A) and the STC plot (FIG. 6B).

In particular, note the differences between FIGS. 5A and 6A. The waveforms of FIG. 6A are slightly misaligned (whereas in FIG. 5A they are not), as can occur when some of the waveforms are phase-shifted or distorted by some anomaly on the path; that is, when something has disturbed the coherency between the receivers. Also compare FIGS. 5B/5C and FIGS. 6B/6C, respectively. There is a peak at approximately 120 μsec/ft in FIG. 5B/5C. The high coherency identifies the shear component. In FIG. 6B/6C, however, there is very little coherency and even a trough at 120 μsec/ft. Similar effects are observed on FIGS. 5D and 6D (which are the same image) and FIGS. 5F and 6F (which are the same plots), with the block arrows indicating the corresponding particular region of the wellbore being investigated.

At the depth indicated by the block arrow in FIGS. 5D and 5E there is no particular evidence of fracturing. In particular, FIG. 5D plots semblance vs. depth, and shows no indications of fracturing. FIG. 5E shows a pulse echo ultrasonic image of the region of the borehole of FIG. 5A. Such borehole images often show fractures in the borehole when present, but in the portion of the wellbore being investigated here, there are none.

The fractures generally appear as a dark line across the image, resembling a crack in the borehole wall. FIG. 6E, which is the same wellbore image as in FIG. 5E, shows such a fracture, as indicated by the block arrow in FIG. 6E. The corresponding lack of coherency is shown in FIG. 6D (which is the same image as FIG. 5D) by the block arrow in FIG. 6D.

Figure 7B:
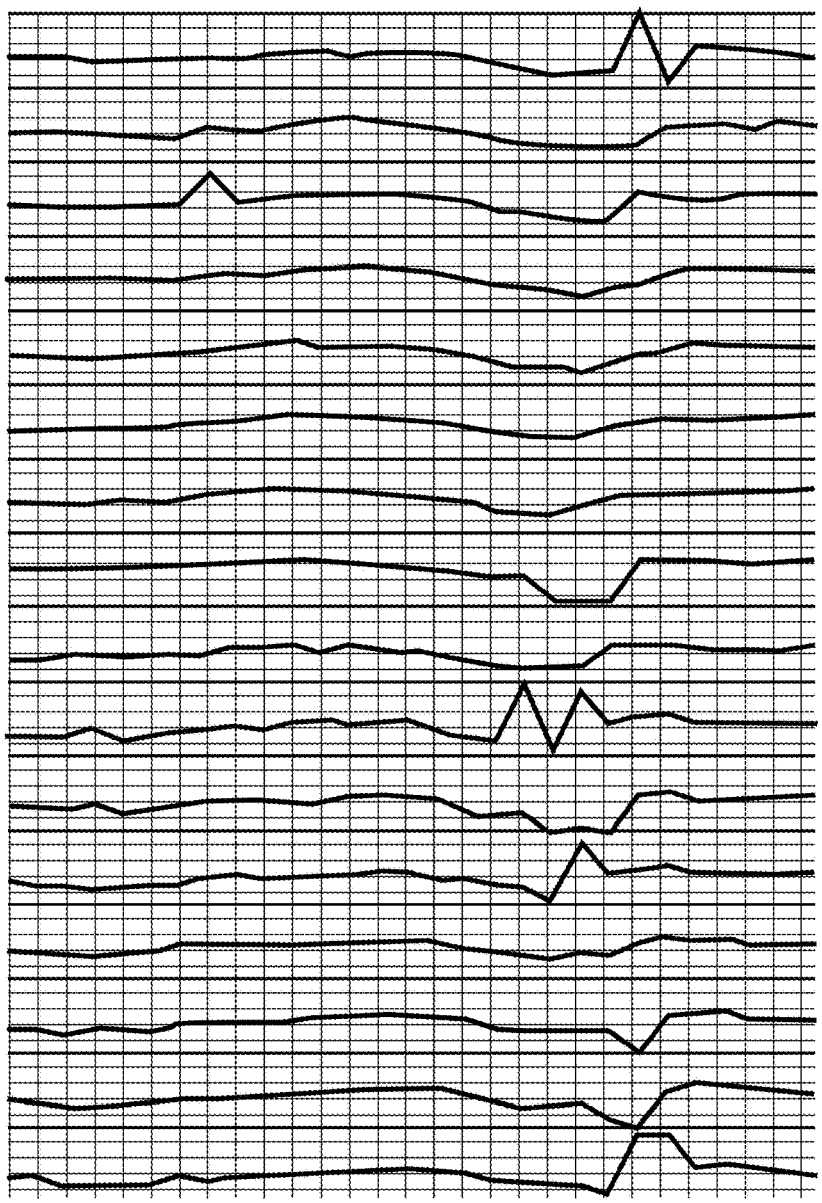
FIG. 7B is a plot of 16 shear slowness curves corresponding to 16 sectors of the borehole of FIG. 4A, in accordance with the present disclosure.
Figure 7A:
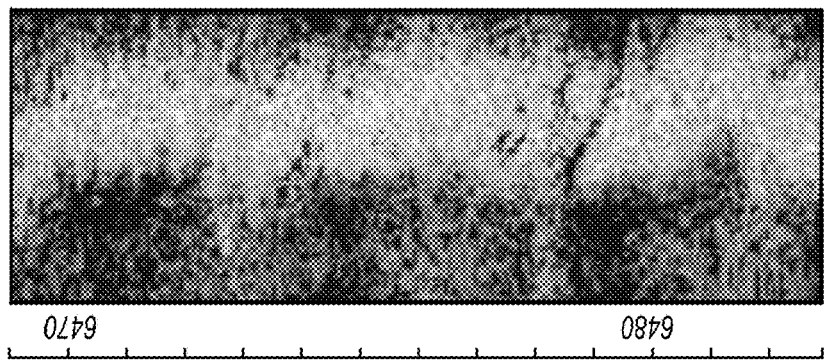
FIG. 7A is an ultrasonic pulse echo borehole image, in accordance with the present disclosure.

FIGS. 7A and 7B show the reaction of an oriented shear measurement to a fracture. FIG. 7A shows the ultrasonic pulse echo plot of FIGS. 5E and 6E. A fracture is apparent at 6479. The 16 plots to the right (FIG. 7B) show shear slowness computed at individual tool orientations, 16 sectors of 22.5 degrees width each. (The first eight plots are the same as FIGS. 5F and 6F.) The effects on the shear slowness is observed at the fracture; it shows an abrupt discontinuity as the sensor array traverses the fracture. These discontinuities are due to poor semblance correlation of the shear signals across the array. The pattern of the shear slowness discontinuity also matches that of the fracture.

The techniques disclosed herein can be performed downhole (for example, while drilling or reaming) or post-processed with recorded waveform data. Fracture detection is independent of mud type. Healed and conductive fractures and axial fractures can be detected, without regard to the borehole wall rugosity. Also, no nuclear sources are used.

Various frequencies can be used for the transmitted signal, ranging from the sonic to the ultrasonic.

Figure 8:
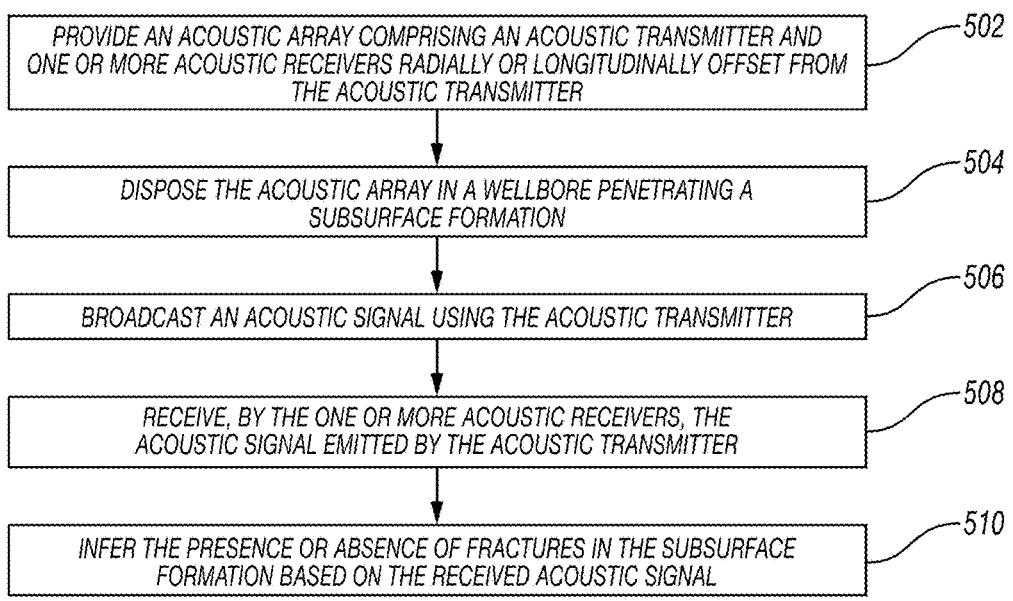
FIG. 8 is a flowchart for using an acoustic array to infer the presence or absence of fractures in a subsurface formation, in accordance with the present disclosure.

FIG. 8 is a flowchart showing one possible embodiment. In this embodiment, an acoustic array comprising an acoustic transmitter and one or more acoustic receivers radially or longitudinally offset from the acoustic transmitter is provided (502). The acoustic array is disposed in a wellbore penetrating a subsurface formation (504). An acoustic signal is broadcast using the acoustic transmitter (506). The acoustic signal emitted by the acoustic transmitter is received by the one or more acoustic receivers (508), and the presence or absence of fractures in the subsurface formation is inferred based on the received acoustic signal (510).

Some of the methods and processes described above, including processes, as listed above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, as listed above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions, and alterations herein without departing from the scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

While only certain embodiments have been set forth, alternatives and modifications will be apparent from the above description to those skilled in the art. These and other alternatives are considered equivalents and within the scope of this disclosure and the appended claims. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method, comprising:
providing an acoustic array comprising an acoustic transmitter and two or more acoustic receivers radially or longitudinally offset from the acoustic transmitter;
disposing the acoustic array in a wellbore penetrating a subsurface formation;
broadcasting an ultrasonic signal using the acoustic transmitter;
causing the two or more receivers to receive the ultrasonic signal, said received ultrasonic signal including a plurality of pressure waves traveling in the wellbore, the pressure waves including transmitted waves and reflected waves, the reflected waves being reflected by a reflector in the subsurface formation;
processing said received ultrasonic signal using slowness time coherence to compute velocities of the pressure waves;
identifying said reflected waves as being those waves having negative velocities;
identifying said transmitted waves as being those waves having positive velocities; and
inferring the presence of the reflector in the subsurface formation by evaluating selected ones of the reflected waves that travel at the same speed as corresponding ones of the transmitted waves.

2. The method of claim 1, wherein said receiving comprises receiving the the ultrasonic signal by at least two receivers located on the same side of the reflector as the acoustic transmitter.

3. The method of claim 1, wherein the reflector is a fracture in the subsurface formation.

4. The method of claim 1, wherein said broadcast ultrasonic signal is transmitted at a fixed or variable rate and said received signal is discretely sampled.

5. The method of claim 1, wherein inferring the presence of the reflector is further based on changes in said received ultrasonic as the acoustic array moves across the reflector.

6. The method of claim 5, wherein the changes in said received ultrasonic signal comprise a time difference between received signals or a difference in amplitudes between received signals.

7. The method of claim 1, wherein inferring the presence of the reflector further comprises using a distortion of the coherency of the received signals.

8. The method of claim 1, wherein the inferring further comprises locating the reflector using determined velocities of one or more of the identified reflected waves and measured arrival times of the one or more of the identified reflected waves.

9. The method of claim 1, further comprising broadcasting the ultrasonic signal from a plurality of locations that are depth-wise and/or azimuthally distinct.

10. The method of claim 9, further comprising producing one or more images using data acquired from the ultrasonic signal broadcast from the plurality of locations.

11. The method of claim 1, wherein said received ultrasonic signals are recorded and post-processed.

12. A method, comprising:
providing an acoustic array comprising an acoustic transmitter and two or more acoustic receivers radially or longitudinally offset from the acoustic transmitter, wherein the acoustic transmitter and the one or more acoustic receivers are carried on a tool collar;
running the acoustic array into a wellbore penetrating a subsurface formation during drilling operations or during a post-drilling operation;
broadcasting an ultrasonic signal using the acoustic transmitter, thereby creating a refracted signal in the subsurface formation that is reflected upon encountering a contrast in acoustic impedance;
causing the two or more receivers to receive the ultrasonic signal, said received ultrasonic signal including a plurality of pressure waves traveling in the wellbore, the pressure waves including transmitted waves and reflected waves, the reflected waves being reflected by the acoustic impedance contrast in the subsurface formation; and
processing said received ultrasonic signal using slowness time coherence to compute velocities of the pressure waves;
identifying said reflected waves as being those waves having negative velocities;
identifying said transmitted waves as being those waves having positive velocities; and
inferring the presence of the acoustic impedance contrast in the subsurface formation by evaluating selected ones of the reflected waves that travel at the same speed as corresponding ones of the transmitted waves.

13. The method of claim 12, wherein said reflected waves are selected from the group consisting of a compressional headwave and a shear headwave.

14. A system, comprising:
an acoustic array comprising an acoustic transmitter and two or more acoustic receivers radially or longitudinally offset from the acoustic transmitter, the system being disposed in a wellbore penetrating a subsurface formation; and
a processor capable of:
broadcasting an ultrasonic signal using the acoustic transmitter;
causing the two or more receivers to receive the ultrasonic signal, said received ultrasonic signal including a plurality of pressure waves traveling in the wellbore, the pressure waves including transmitted waves and reflected waves, the reflected waves being reflected by a reflector in the subsurface formation; and
identifying said reflected waves as being those waves having negative velocities;
identifying said transmitted waves as being those waves having positive velocities; and
inferring the presence or absence of fractures in the subsurface formation b evaluating selected ones of the reflected waves that travel at the same speed as corresponding ones of the transmitted waves.

* * * * *